US012681640B2

(12) United States Patent
Chandrashekhara et al.

(10) Patent No.: US 12,681,640 B2
(45) Date of Patent: Jul. 14, 2026

(54) METHOD AND APPARATUS FOR DETERMINING TIME SERIES-BASED ASYNCHRONOUS REPLICATON CYCLE TIME

(71) Applicant: Dell Products L.P., Round Rock, TX (US)

(72) Inventors: Sandeep Chandrashekhara, Shrewsbury, MA (US); Ramesh Doddaiah, Westborough, MA (US); Mohammed Aamir VT, Bangalore (IN); Mohammed Asher, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 229 days.

(21) Appl. No.: 18/632,800

(22) Filed: Apr. 11, 2024

(65) Prior Publication Data

US 2025/0321673 A1    Oct. 16, 2025

(51) Int. Cl.
*G06F 3/06* (2006.01)
(52) U.S. Cl.
CPC .............. *G06F 3/061* (2013.01); *G06F 3/064* (2013.01); *G06F 3/065* (2013.01); *G06F 3/0683* (2013.01)
(58) Field of Classification Search
CPC .......... G06F 3/061; G06F 3/064; G06F 3/065; G06F 3/0683; G06F 3/0611; G06F 3/0613; G06F 3/067; G06F 11/1658; G06F 11/2053; G06F 11/2056; G06F 11/2064; G06F 11/2082; G06F 11/2097; G06F 16/178
See application file for complete search history.

(56) References Cited

U.S. PATENT DOCUMENTS 9,910,608 B2 * 3/2018 Muramatsu ............. G06F 3/067
2008/0294700 A1 * 11/2008 Sugimoto ............. G06F 16/178

* cited by examiner

*Primary Examiner* — Idriss N Alrobaye
*Assistant Examiner* — Richard B Franklin
(74) *Attorney, Agent, or Firm* — Daly, Crowley, Mofford & Durkee, LLP

(57) ABSTRACT

A method comprising: generating a write-on-write distribution for a plurality of data units in a data entity, the write-on-write distribution including a plurality of buckets, each bucket corresponding to a different write-on-write time range, each bucket having a respective bucket size that is based on a count of ones of the plurality of data units whose respective predicted write-on-write times fall within the bucket's write-on-write time range; identifying one or more utilization metrics of a storage system where the data entity is hosted; classifying a representative bucket size of the write-on-write distribution and the one or more utilization metrics with a machine learning model to predict a replication period for the data entity, the representative bucket size being a bucket size within a predetermined distance from a mean bucket size of the write-on-write distribution; and configuring the storage system to replicate the data entity in accordance with the replication period.

20 Claims, 7 Drawing Sheets

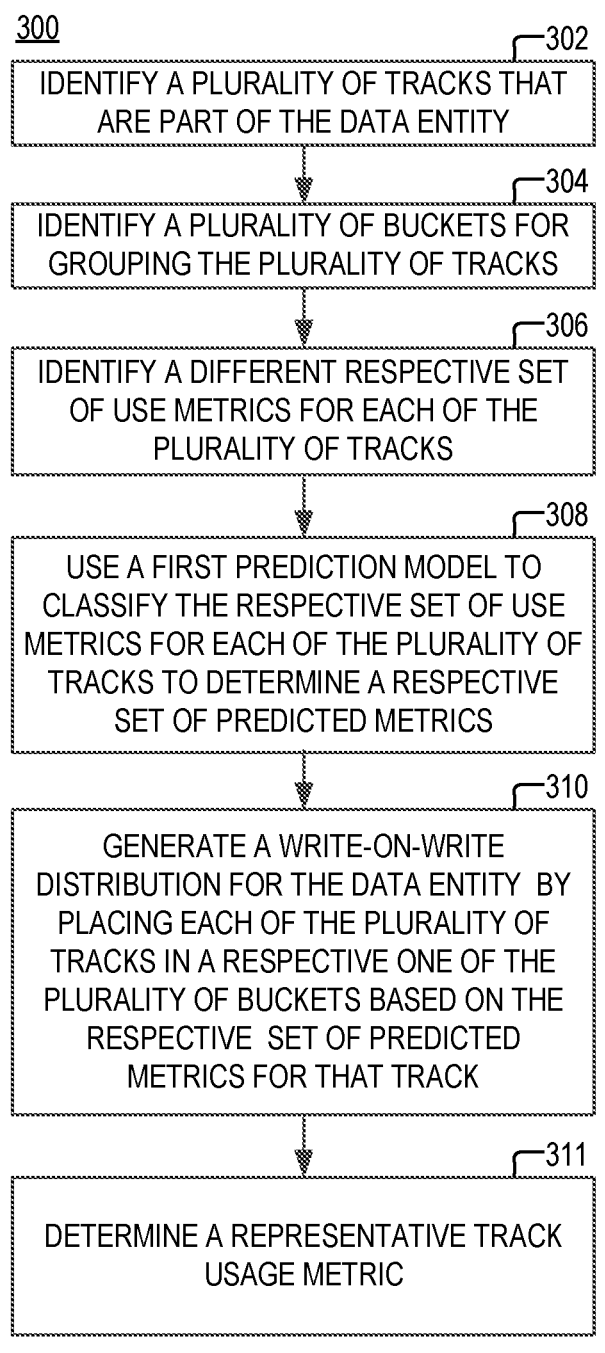

300

302
IDENTIFY A PLURALITY OF TRACKS THAT
ARE PART OF THE DATA ENTITY

304
IDENTIFY A PLURALITY OF BUCKETS FOR
GROUPING THE PLURALITY OF TRACKS

306
IDENTIFY A DIFFERENT RESPECTIVE SET
OF USE METRICS FOR EACH OF THE
PLURALITY OF TRACKS

308
USE A FIRST PREDICTION MODEL TO
CLASSIFY THE RESPECTIVE SET OF USE
METRICS FOR EACH OF THE PLURALITY OF
TRACKS TO DETERMINE A RESPECTIVE
SET OF PREDICTED METRICS

310
GENERATE A WRITE-ON-WRITE
DISTRIBUTION FOR THE DATA ENTITY  BY
PLACING EACH OF THE PLURALITY OF
TRACKS IN A RESPECTIVE ONE OF THE
PLURALITY OF BUCKETS BASED ON THE
RESPECTIVE  SET OF PREDICTED
METRICS FOR THAT TRACK

311
DETERMINE A REPRESENTATIVE TRACK
USAGE METRIC

FIG. 3

BUCKET DEFINITION 502

542

<WRITE-ON-WRITE TIME(S)>

WRITE-ON-WRITE DISTRIBUTION 504

506

506

506

WRITE-ON-WRITE DISTRIBTUION ENTRY 506

BUCKET ID 512

COUNT VALUE 514

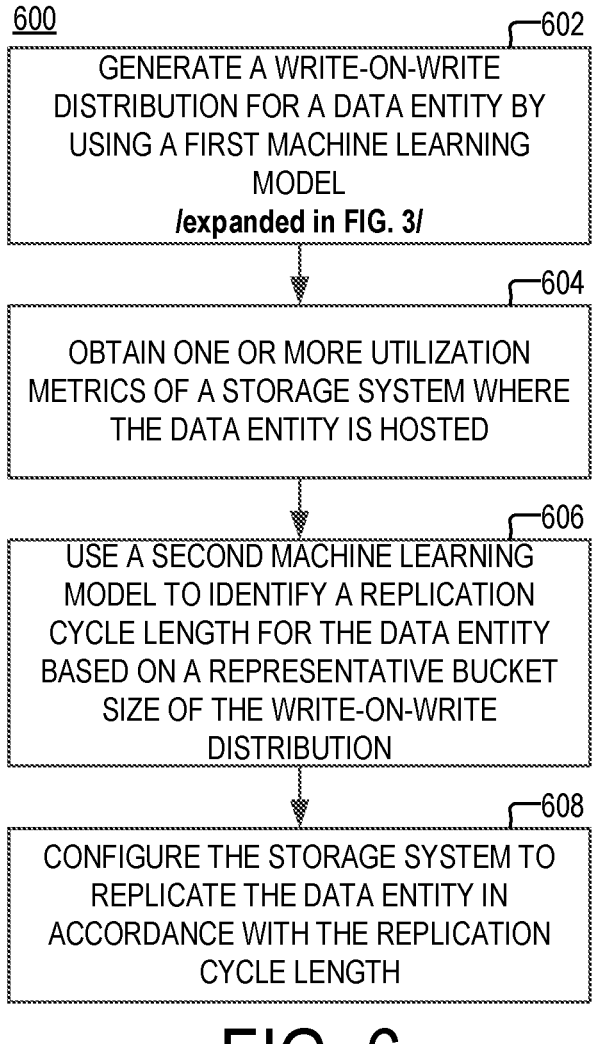

600                                           ┌─602
GENERATE A WRITE-ON-WRITE
DISTRIBUTION FOR A DATA ENTITY BY
USING A FIRST MACHINE LEARNING
MODEL
*/expanded in FIG. 3/*

┌─604
OBTAIN ONE OR MORE UTILIZATION
METRICS OF A STORAGE SYSTEM WHERE
THE DATA ENTITY IS HOSTED

┌─606
USE A SECOND MACHINE LEARNING
MODEL TO IDENTIFY A REPLICATION
CYCLE LENGTH FOR THE DATA ENTITY
BASED ON A REPRESENTATIVE BUCKET
SIZE OF THE WRITE-ON-WRITE
DISTRIBUTION

┌─608
CONFIGURE THE STORAGE SYSTEM TO
REPLICATE THE DATA ENTITY IN
ACCORDANCE WITH THE REPLICATION
CYCLE LENGTH

FIG. 6

METHOD AND APPARATUS FOR DETERMINING TIME SERIES-BASED ASYNCHRONOUS REPLICATON CYCLE TIME

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: generating a write-on-write distribution for a plurality of data units in a data entity, the write-on-write distribution including a plurality of buckets, each bucket corresponding to a different write-on-write time range, each bucket having a respective bucket size that is based on a count of ones of the plurality of data units whose respective predicted write-on-write times fall within the bucket's write-on-write time range; identifying one or more utilization metrics of a storage system where the data entity is hosted; classifying a representative bucket size of the write-on-write distribution and the one or more utilization metrics with a machine learning model to predict a replication period for the data entity, the representative bucket size being a bucket size within a predetermined distance from a mean bucket size of the write-on-write distribution; and configuring the storage system to replicate the data entity in accordance with the replication period, wherein the data entity includes a data volume or a storage group and the replication period of the data entity specifies a duration between consecutive replications of the data entity.

According to aspects of the disclosure, a system is provided, comprising: a memory; and at least one processor that is operatively coupled to the memory, the at least one processor being configured to perform the operations of: generating a write-on-write distribution for a plurality of data units in a data entity, the write-on-write distribution including a plurality of buckets, each bucket corresponding to a different write-on-write time range, each bucket having a respective bucket size that is based on a count of ones of the plurality of data units whose respective predicted write-on-write times fall within the bucket's write-on-write time range; identifying one or more utilization metrics of a storage system where the data entity is hosted; classifying a representative bucket size of the write-on-write distribution and the one or more utilization metrics with a machine learning model to predict a replication period for the data entity, the representative bucket size being a bucket size within a predetermined distance from a mean bucket size of the write-on-write distribution; and configuring the storage system to replicate the data entity in accordance with the replication period, wherein the data entity includes a data volume or a storage group and the replication period of the data entity specifies a duration between consecutive replications of the data entity.

According to aspects of the disclosure, a non-transitory computer-readable medium storing one or more processor-executable instructions, which, when executed by at least one processor, cause the at least one processor to perform the operations of: generating a write-on-write distribution for a plurality of data units in a data entity, the write-on-write distribution including a plurality of buckets, each bucket corresponding to a different write-on-write time range, each bucket having a respective bucket size that is based on a count of ones of the plurality of data units whose respective predicted write-on-write times fall within the bucket's write-on-write time range; identifying one or more utilization metrics of a storage system where the data entity is hosted; classifying a representative bucket size of the write-on-write distribution and the one or more utilization metrics with a machine learning model to predict a replication period for the data entity, the representative bucket size being a bucket size within a predetermined distance from a mean bucket size of the write-on-write distribution; and configuring the storage system to replicate the data entity in accordance with the replication period, wherein the data entity includes a data volume or a storage group and the replication period of the data entity specifies a duration between consecutive replications of the data entity.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a flowchart of an example of a process, according to aspects of the disclosure;

FIG. 6 is a bucket-definition track-count pair, according to aspects of the disclosure.

DETAILED DESCRIPTION

Figure 1:
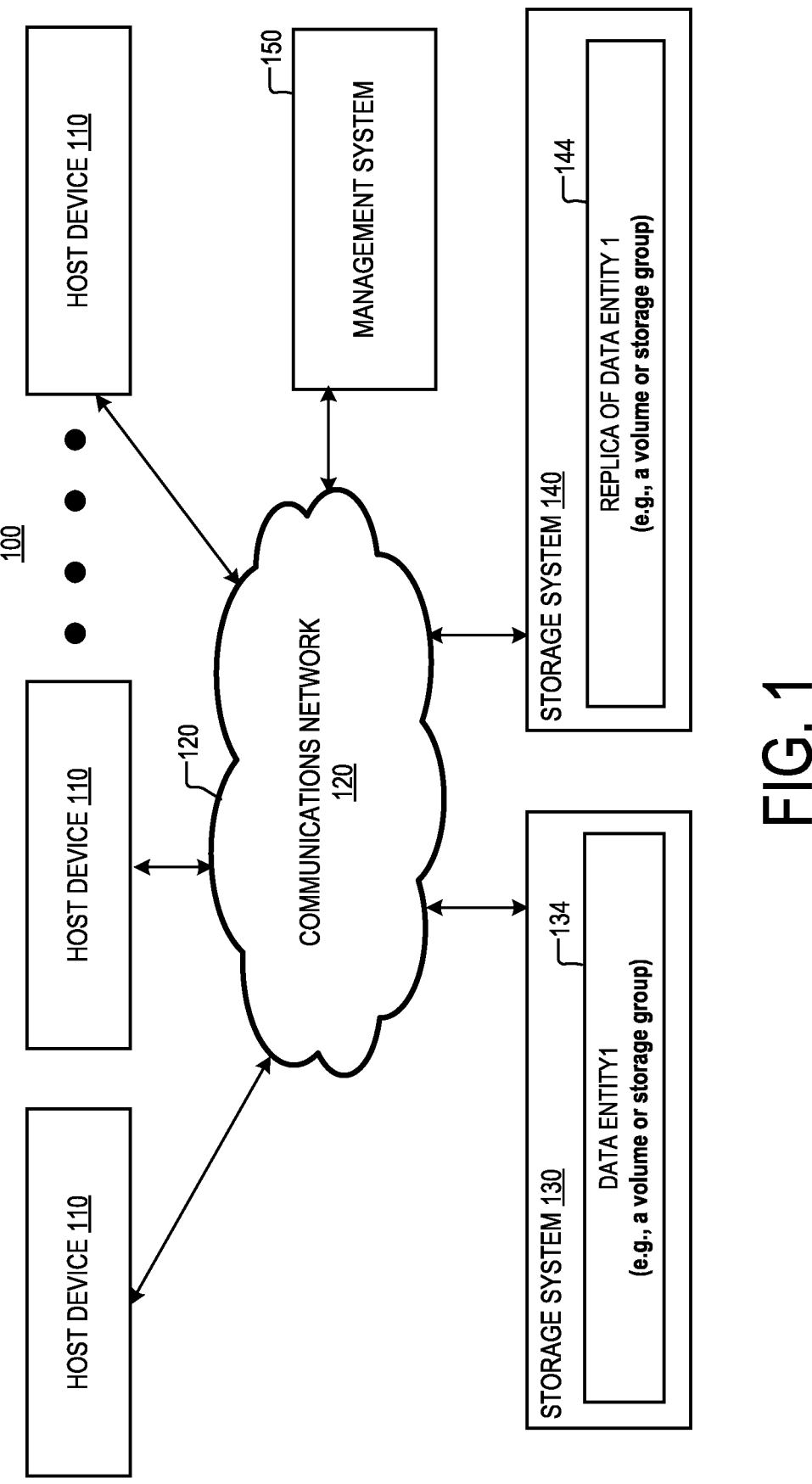
FIG. 1 is a diagram of an example of a system, according to aspects of the disclosure.

FIG. 1 is a diagram of an example of a system 100, according to aspects of the disclosure. As illustrated, system 100 may include a plurality of host devices 110 that are coupled via a communications network 120 to a storage system 130, a storage system 140, and a management system 150. Each of the host devices 110 may include one or more of a desktop computer, a smartphone, a laptop, and/or any other suitable type of computing device. For example, in some implementations, any of the host devices 110 may be the same or similar to the computing device 700, which is discussed further below with respect to FIG. 7. The communications network 120 may include one or more of a local area network (LAN), a wide area network (WAN), a wireless network, a cellular network, a 5G network, the Internet, an InfiniBand network, and/or any other suitable type of network. Storage system 130 may include any suitable type of storage system, such as a location-addressable storage system or a content-addressable storage system, for example. Storage system 140 may include any suitable type of storage system, such as a location-addressable storage system or a content-addressable storage system, for example. In some implementations, each of storage systems 130 and 140 may be the same or similar to the storage system 200, which is discussed further below with respect to FIG. 2. Management system 150 may be a computing device, such as the computing device 700 which is discussed further below with respect to FIG. 7.

Storage system 130 may store a data entity 134 and storage system 140 may store a data entity 144. According to the present example, each of data entities 134 and 144 is a data volume. However, alternative implementations are possible in which each of data entities 134 and 144 is a storage group. As used herein, the term "storage group" refers to a group of data volumes, which are replicated together. Each of data entities 134 and 144 is divided into tracks. A track is a set of blocks, wherein each block has a corresponding block address.

Data entity 144 is a replica of data entity 134, meaning that data entity 144 is arranged to store the same data as data entity 134. When a write is performed to data entity 134, the data being written is also copied to data entity 144. Similarly, when data is deleted from data entity 134, the same data is also deleted from data entity 144. As can be readily appreciated, the replication of data from data entity 134 to data entity 144 may help prevent data loss.

According to the present example, data entity 134 is replicated (or copied) asynchronously. In one example, the storage and asynchronous replication of data by storage systems 130 and 140 is performed in accordance with the following mechanism: (1) user data associated with incoming write requests is cached into the cache memory of storage system, (2) the user data is than destaged from the cache memory into a RAID array (or other non-volatile memory) of the storage system 130, (iii) the user data is then copied from the cache memory of storage system 130 to storage system 140, and (iv) cache slots, in the cache memory of storage system 130, which are used to store the user data are deallocated.

The replication of data from storage system 130 to storage system 140 is performed asynchronously. Moreover, this replication of data from storage system 130 to storage 140 is performed in accordance with a replication cycle. The replication cycle may be a value that determines how often the states of data entities 134 and 144 are synchronized (e.g., by copying data from data entity 134 to data entity 144). For example, if the replication cycle length is equal to 5 seconds, this means that at the end of every 5-second period, the states of data entity 144 would be synchronized with the state of data entity 134 (e.g., by copying any new data that has been received and stored into data entity 134 during the 5-second period). As another example, if the replication cycle is equal to 8 seconds, this means that at the end of every 8-second period, the states of data entity 144 would be synchronized with the state of data entity 134 (e.g., by copying any new data that has been received and stored into data entity 134 during the 8-second period).

Another concept that is related to data replication is "write-on-write time". Write-on-write time is the time between consecutive writes to the same track. The concept of write-on-write time interacts with the concept of replication cycle. Consider an example in which a track in data entity 134 has a write-on-write time of 7 seconds. In this example, first data is written to the track at second #1, and the first data is subsequently overwritten with second data at second #7. Now, consider a first instance in which the replication cycle is 6 seconds. In the first instance, the first data would be replicated to data entity 144 at second #6 and the second data would be replicated to data entity 144 at second #12. On the other hand, if the replication cycle is set to 8 seconds, the second data would be replicated at second #8 and the second data would not be replicated at all because it would be overwritten by the end of the replication cycle.

The point of this example is that increasing the length of the replication cycle can prevent data from being unnecessarily replicated and conserve network bandwidth, as well as other system resources. However, if the replication cycle is excessively long, this would make system 100 more vulnerable to data loss. So, there is a tradeoff between more efficient resource usage and increased vulnerability to data loss which is associated with making the replication cycle too long.

In conventional storage systems, the replication cycle is fixed. For example, the replication cycle length may remain 5 seconds until it is reset by a system administrator. By contrast, the present disclosure recognizes that there are periods when it is advantageous to have a long replication cycle and periods in which it is advantageous to have a short replication cycle. In this regard, the present disclosure provides a technique for dynamically setting the replication cycle for data entities 134 and 144 based on various usage metrics. The technique can elongate the replication cycle when the data entity 134 is experiencing a write burst, thus preventing a waste of system resources (resulting from replicating data that would be overwritten in short order, during the burst). The technique may also shorten the replication cycle during slow periods, ensuring increased protection against data loss, for whatever smaller amounts of data are written during these periods.

In one example, the technique may be implemented in accordance with processes 300 and 600, which are discussed further below with respect to FIGS. 3 and 5, respectively. In some implementations, processes 300 and 600 may be executed by management system 150. Although in the present example, processes 300 are executed by the management system 150, alternative implementations are possible in which processes 300 and 600 are executed by any computing device, or set of computing devices, that are part of storage system 130 or storage system 140. For example, processes 300 and 600 may be executed by one or more storage processors that are part of storage system 130 and/or storage system 140. Although in the present example processes 300 and 600 are implemented in software, alternative implementations are possible in which they are implemented in hardware or as a combination of hardware and software.

Figure 2:
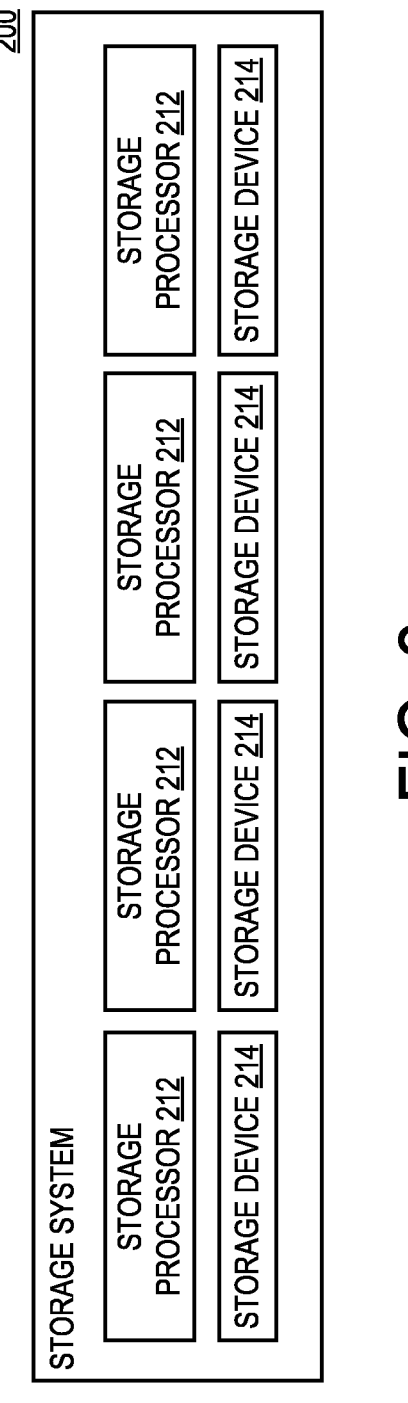
FIG. 2 is a diagram of an example of a storage system, according to aspects of the disclosure.
Figure 7:
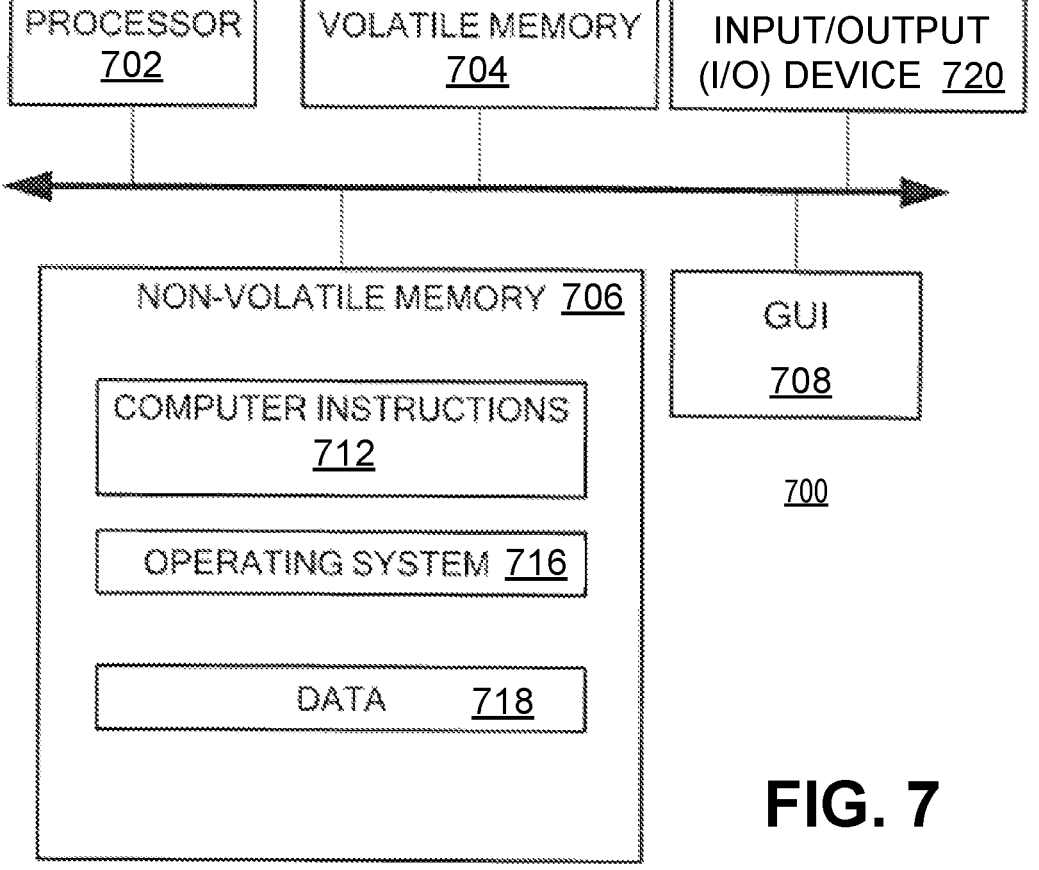
FIG. 7 is a diagram of an example of a computing device, according to aspects of the disclosure.

FIG. 2 shows an example of a storage system 200 in further detail, according to aspects of the disclosure. As illustrated, storage system 200 may include a plurality of storage processors 212 and a plurality of storage devices 214. Each of the storage processors 212 may include a computing device that is configured to receive I/O requests (e.g., read or write requests, etc.) from any of the host devices 110 and execute the received I/O requests by reading or writing data to the storage devices 214. In some implementations, each of the storage processors 212 may have an architecture that is the same or similar to the architecture of the computing device 700, which is shown in FIG. 7. Each of the storage devices 214 may include any of a solid-state drive (SSD), a non-volatile random-access memory (nvRAM) device, a non-volatile memory express (NVME) device, a hard disk (HD), and/or any other suitable type of storage device. In some implementations, the storage devices 214 may be arranged in one or more Redundant Array(s) of Independent Disks (RAID) arrays. In some implementations, the data that comprises data entity 134 may be stored in the RAID array.

FIG. 3 is a flowchart of an example of a process 300, according to aspects of the disclosure.

At step 302, a plurality of tracks that are part of data entity 134 is identified. The plurality of tracks may include some or all of the tracks in data entity 134.

Figures 5A, 5B, 5C:
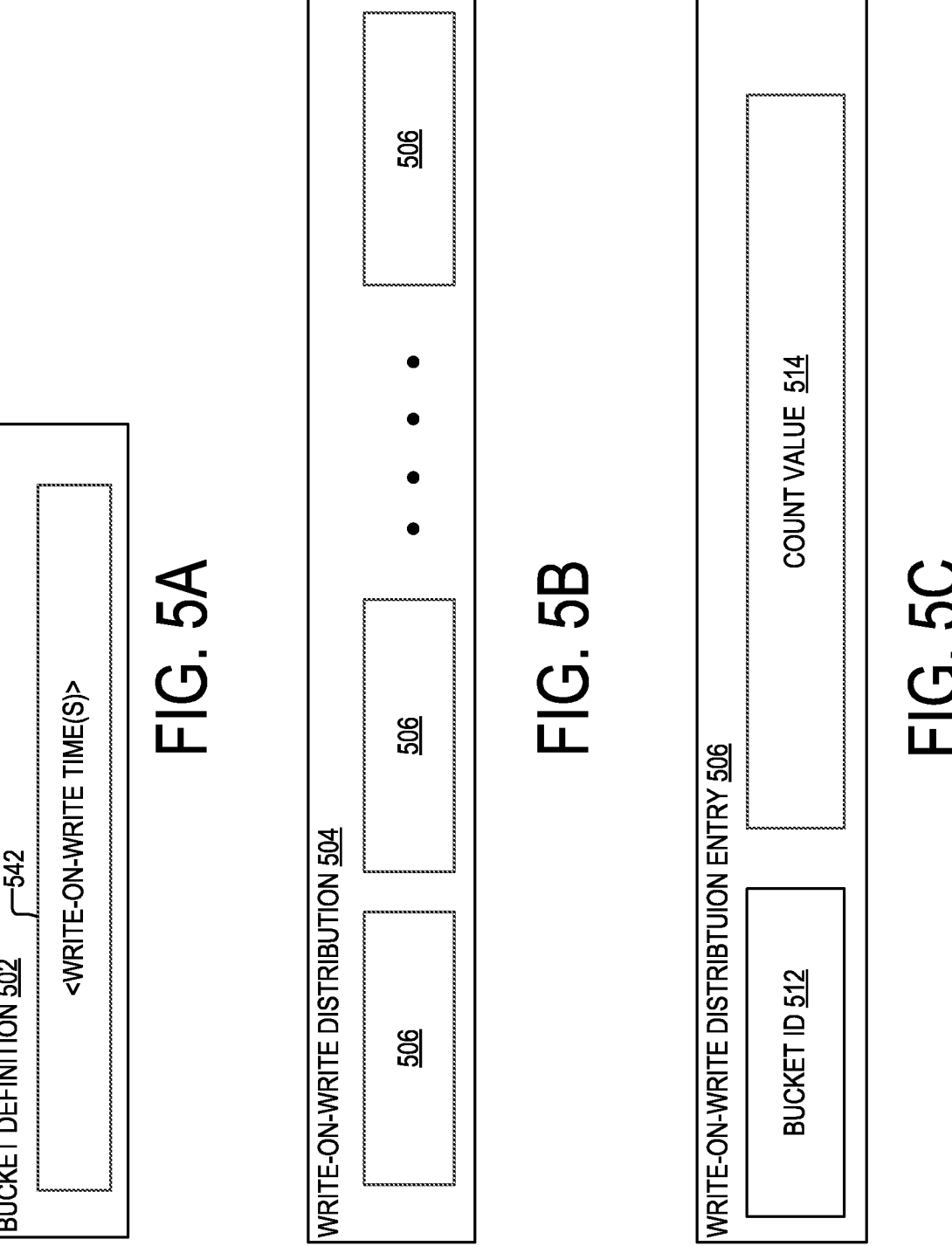
FIG. 5A is a diagram of an example of a bucket definition, according to aspects of the disclosure.
FIG. 5B is a diagram of an example of a bucket distribution, according to aspects of the disclosure.
FIG. 5C is a diagram of an example of a distribution entry, according to aspects of the disclosure.

At step 304, a plurality of buckets is identified. According to the present example, identifying the plurality of buckets includes identifying a different respective bucket definition for each of the plurality of buckets. Each bucket definition may be the same or similar to bucket definition 502, which is shown in FIG. 5A. As illustrated, bucket definition 502 may include an indication of a range 542 of write-on-write times. In some implementations, each of the plurality of buckets may correspond to a different range of write-on-write times. For example, the first bucket in the plurality may correspond to the range of 1-2 Sec (it is a hyperparameter), the second bucket in the plurality may correspond to the range of 2-3 Sec, the third bucket in the plurality may correspond to the range of 3-4 Sec, the fourth bucket in the plurality may correspond to the range of 4-5 Sec, and so forth.

At step 306, a different respective set of use metrics is obtained for each of the plurality of tracks (identified at step 302). In one example, for a given track, the set of use metrics may include a plurality of write-on-write values. Each of the plurality of write-on-write values may be indicative of the duration between a pair of consecutive writes that are received for the given track during the predetermined period (e.g., a 60 Seconds period (it is a hyperparameter) ending when step 306 begins to be executed). For example, if five writes are received during the period, the set of write-on-write values may include a first value that indicates the time delay between the first and second writes, a second value that indicates the time delay between the second and third writes, a third value that indicates the time delay between the third and fourth writes, and a fourth value that indicates the time delay between the fourth and fifth writes, and so forth. Furthermore, in some implementations, the use metrics may include a plurality of I/O sizes that are associated with writes with the given part. Each of the I/O sizes may correspond to the data size that is associated with incoming write requests for the track that are received during the predetermined time period.

At step 308, a respective predicted write-on-write time (hereinafter "predicted time") and a respective I/O size (hereinafter "predicted I/O size") is identified for each of the plurality of tracks (identified at step 302). The predicted time may correspond to a future period. In one example, the future period may have a predetermined duration, such as five minutes, and it may start running when step 308 begins to be executed. According to the present example, the predicted time for a given track is the average write-on-write time for the given track during the future period. However, alternative implementations are possible, in which the predicted time is the mean write-on-write time for the given track during the future period, the maximum write-on-write time for the given track during the future period, or the minimum write-on-write time for the given track during the future period. Stated succinctly, the predicted time may be any value that is indicative of what write-on-write times can be expected for the given track during the future period.

As used herein, the term "I/O size for a write request" means the average number of bytes of data that is received with the write request—i.e., the number of bytes of data that is requested to be written by the write request. The predicted I/O size for any of the plurality of tracks may be a predicted average I/O size for the write requests that are expected for the track during the predicted future periods. However, in alternative implementations, the predicted I/O size may be the I/O size of a particular I/O request (i.e., write request) that is expected to be received during the future period, the maximum I/O size out of all requests that are expected to be received, and so forth. Stated succinctly, the predicted time may be any value (or metric) that is indicative of the amount of data that is going to be written to the track during the future period. For example in some implementations, instead of (or in addition to) I/O size, the respective amount of network bandwidth that would be required to replicate each track to storage system 140 during the future period may be determined (hereinafter "expected track bandwidth").

According to the present example, the respective predicted time and predicted I/O size for each of the plurality of tracks is determined by classifying the track's respective set of use metrics with a machine learning model. According to the present example, the machine learning model is a neural network, but the present disclosure is not limited thereto. The neural network may be trained by using a supervised learning algorithm. The training data for the neural network may include a plurality of entries. Each entry may include a sample usage metric set and a label identifying the predicted time that corresponds to the sample usage set and an expected I/O size. Although in the present example, a single neural network is used, alternative implementations are possible in which a first neural network is used to calculate the predicted times for the tracks and a second neural network is used to calculate the expected I/O sizes for the tracks. The first and second neural networks may be trained using supervised learning. The training data set for the first neural network may include sample usage metric sets, wherein each usage metric set is mapped to label identifying a corresponding predicted time. The training data set for the first neural network may include sample usage metric sets, wherein each usage metric set is mapped to label identifying a corresponding predicted I/O. In one example, each of the first and second neural networks may be a feed-forward network, but the present disclosure is not limited thereto. Those of ordinary skill in the art will readily recognize, after reading the present disclosure, that a variety of existing neural network architectures may be utilized to map usage metric sets to corresponding predicted time and I/O size values. Although in the present example, the neural networks discussed with respect to step 308 are configured to predict expected time and expected I/O size, in alternative implementations any of the networks may be trained to estimate the value of another track usage metric, in addition to or instead of expected time and expected I/O size. For example, the other usage metric may include the bandwidth that would be required to replicate the track to storage system 140 during the future period.

At step 310, a write-on-write distribution is generated for the data entity 134 by placing each of the predicted times (identified at step 308) in a corresponding one of the buckets. An example of the write-on-write distribution is shown in FIG. 5B. As illustrated, the write-on-write distribution may include a plurality of entries 506. As illustrated in FIG. 5C, each entry 506 may include a respective identifier 512 of one of the buckets (identified at step 504) and a count value 514. The count value 514 may be equal to (or otherwise based on) the number of tracks (out of the plurality identified at step 302) whose predicted times (obtained at step 308) fall into the write-on-write range that is associated with the bucket that is recognized by identifier 512. For example, if bucket '1' has a write-on-write range of '1-2 Sec' and the plurality of tracks (identified at step 302) includes 5 tracks whose predicted times fall within the range of '1-2 Sec', the counter value for bucket '1' would be equal to '5'. As another example, if bucket '2' has a write-on-write range of '2-3 Sec' and the plurality of tracks (identified at step 302) includes 7 tracks whose predicted times fall within the range of '2-3 Sec', the counter value for bucket '2' would be equal to '7'. As yet another example, if bucket '3' has a write-on-write range of '3-4 Sec' and the plurality of tracks (identified at step 302) includes 11 tracks whose predicted times fall within the range of '3-4 Sec', the counter value for bucket '3' would be equal to '11'.

At step 311, a representative track usage metric is determined for the plurality of tracks. According to the present example, the representative track usage metric is the mean of the expected I/O sizes determined at step 308 and/or any value that is within +/−15% of the mean of the expected I/O sizes. However, in alternative implementations, the representative track usage metric may be equal to the mean of the expected track bandwidths (or other expected metrics) that is determined at step 308 and/or any value that is within +/−15% of the mean of.

Figure 4:
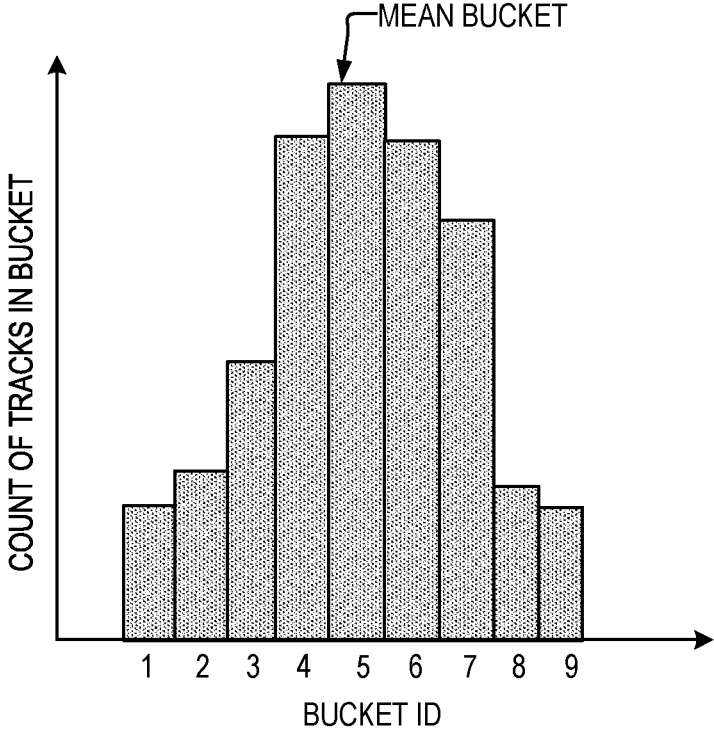
FIG. 4 is a graph of a write-on-write distribution, according to aspects of the disclosure.

FIG. 4 shows a graph of a write-on-write distribution for the plurality of tracks (identified at step 302). The write-on-write distribution includes 9 buckets. The X-axis of the graph is a respective identifier for each of the buckets and the Y-axis corresponds to the count of tracks from the plurality whose respective write-on-write times fall in each of the buckets that are identified on the X-axis. As noted above, each bucket may be associated with a different respective write-on-write range and a track falls into a given write-on-write range when the predicted time for the track belongs in the write-on-write range. As used herein, the term "size of a bucket" means the count of tracks that fall into the bucket. FIG. 4 shows that bucket #5 is the mean bucket because its size is equal to (or the closest to) the mean of all buckets in the distribution size for the write-on-write distribution. The size of the mean bucket (e.g., bucket #5") is referred to as the "mean bucket size of the distribution". The term "representative bucket size for the write-on-write distribution" is herein defined as the mean bucket size of the distribution or any other value that falls within +/−15% from the mean bucket size.

FIG. 6 is a flowchart of an example of a process 600, according to aspects of the disclosure.

At step 602, a write-on-write distribution generated for data entity 134. The write-on-write distribution may be generated by using a first machine learning model. In addition, at step 602 a representative track usage metric is generated for data entity 134. The data write-on-write distribution and representative track usage metric may be generated in accordance with the process 300, which is discussed above with respect to FIG. 3. The first machine learning model may include one or more neural networks, such as those discussed with respect to FIG. 3. According to the present example, the representative track usage metric includes a representative I/O size. However, the present disclosure is not limited thereto.

At step 604, a respective time series is obtained for each of one or more utilization metrics of storage system 130. The time series for any given utilization metric may include the respective values of the utilization metrics at different time instants in a predetermined period preceding the execution of step 604 (e.g., the 5-minute period ending when step 604 starts to be executed). The utilization metrics may include "amount of network bandwidth that is consumed by the replication of data from data entity 134 to data entity 134". Additionally or alternatively, the utilization metrics may include "disk bandwidth utilization". The disk bandwidth utilization may be the amount of bandwidth that is consumed by copying data from the cache of storage system 130 to the RAID array (or any storage devices) where the data entity 134 is stored. Additionally or alternatively, the utilization metrics may include "CPU utilization". The CPU utilization may be the average CPU utilization of the storage processors in storage system 130 and/or any other measure of the load on the CPU(s) of one or more of the storage processors in storage system 130. Additionally or alternatively, the utilization metrics may include "network bandwidth utilization." The network bandwidth utilization may measure the total load on the communications network connecting storage system 130 with storage system 140, which is used for the replication of data from data entity 134 to data entity 134. Additionally or alternatively, the utilization metrics may include "cache write pressure". The cache write pressure may include any indicium of the number of writes to data entity 134 that are currently waiting to be destaged from the cache of storage system 130 into the RAID array (or other storage devices) where data entity 134 is stored. Additionally or alternatively, the utilization metrics may further include "memory bandwidth utilization". The memory bandwidth utilization may be the average random-access memory (RAM) bandwidth that is available to the storage processors in storage system 130 and/or any other measure of the available RAM bandwidth of one or more of the storage processors in storage system 130.

At step 606, a replication cycle is calculated for data entity 134. The replication cycle is calculated by classifying the write-on-write distribution (obtained at step 602) and the utilization metrics (obtained at step 604) with a second machine learning model. According to the present example, the second machine learning model may be a deep learning model including one or more Transformer neural networks.

In one example, the deep learning model may receive a signature and classify the signature in one of a plurality of categories, wherein each of the plurality of categories corresponds to a different replication cycle value. The signature may encode: (i) the representative bucket size for the write-on-write distribution determined at step 602, (ii) the representative track usage metric determined at step 602, and (iii) one or more of the time series sets that are determined at step 604. Encoding the data identified at (i), (ii), and (iii) may include concatenating the data or using any suitable type of encoding. It will be understood that the present disclosure is not limited to any specific method for generating a signature based on the data obtained at steps 602 and 604. In some implementations, one of items (i) and (ii) may be omitted from the signature.

In some implementations, the second machine learning model may be trained using supervised learning. The second machine learning model may be trained by using a training data set. The training data set may include a plurality of sample signatures and a different respective label that corresponds to each of the sample signatures. Each label may identify a replication cycle value that corresponds to the label's associated sample signature.

At step 608, storage system 130 is configured to replicate data entity 134 in accordance with the replication cycle (calculated at step 606). As noted above, the replication cycle may specify the delay between consecutive synchronizations of the state of data entity 144 with the state of data entity 134. For example, a replication cycle value of 60 may specify that the state of data entity 144 should be synchronized with the state of data entity 134 every 60 seconds. Synchronizing the state of data entity 144 with the state of data entity 134 every 60 seconds may include replicating all writes to data entity 134 that are received in the past 60 seconds to data entity 134.

The examples of FIGS. 3 and 6 provide that statistics are collected for different tracks in data entity 134. However, alternative implementations are possible in which a different type of data unit is used, such as a logical block address or a stripe. For example, at step 306, a different respective set of use metrics may be obtained for each of a plurality data units in data entity 134, where the data units are one of stripes, tracks, or logical block addresses. Similarly, at step 308, a respective predicted time may be obtained for each of the plurality of data units, and the write-on-write distribution of storage time may generated based on the predicted times of the data units, in the manner discussed with respect to FIGS. 4-5C.

Referring to FIG. 7, in some embodiments, a device 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704. Program code may be applied to data entered using an input device of GUI 708 or received from I/O device 720.

FIGS. 1-7 are provided as an example only. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard (4/8).

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
   generating a write-on-write distribution for a plurality of data units in a data entity, the write-on-write distribution including a plurality of buckets, each bucket corresponding to a different write-on-write time range, each bucket having a respective bucket size that is based on a count of ones of the plurality of data units whose respective predicted write-on-write times fall within the bucket's write-on-write time range;
   identifying one or more utilization metrics of a storage system where the data entity is hosted;
   classifying a representative bucket size of the write-on-write distribution and the one or more utilization metrics with a machine learning model to predict a replication period for the data entity, the representative bucket size being a bucket size within a predetermined distance from a mean bucket size of the write-on-write distribution; and
   configuring the storage system to replicate the data entity in accordance with the replication period,
   wherein the data entity includes a data volume or a storage group and the replication period of the data entity specifies a duration between consecutive replications of the data entity.

2. The method of claim 1, wherein generating the write-on-write distribution includes:
   identifying a different respective set of use metrics for each of the plurality of data units; and
   classifying the respective set of use metrics for each of the plurality of data units with another machine learning model, wherein the other machine learning model is configured to yield, at least in part, an indication of a predicted write-on-write time.

3. The method of claim 2, wherein the respective set of use metrics for any given one of the plurality of data units includes a plurality of time values, each time value identifying a duration between a different pair of successive writes to the given data unit.

4. The method of claim 1, wherein the representative bucket size includes a mean bucket size of the write-on-write distribution.

5. The method of claim 1, wherein the one or more utilization metrics of the storage system include one or more of CPU utilization, storage device utilization, network bandwidth utilization, cache write pressure, and memory bandwidth utilization.

6. The method of claim 1, wherein the one or more utilization metrics include an amount of bandwidth that is used by the storage system for replicating the data entity.

7. The method of claim 1, wherein each of the plurality of subsets of the plurality of data units is a proper subset of the plurality of data units.

8. The method of claim 1, wherein each of the plurality of data units includes a different respective track of the data entity.

9. A system, comprising:
   a memory; and
   at least one processor that is operatively coupled to the memory, the at least one processor being configured to perform the operations of:
   generating a write-on-write distribution for a plurality of data units in a data entity, the write-on-write distribution including a plurality of buckets, each bucket corresponding to a different write-on-write time range, each bucket having a respective bucket size that is based on a count of ones of the plurality of data units whose respective predicted write-on-write times fall within the bucket's write-on-write time range;
   identifying one or more utilization metrics of a storage system where the data entity is hosted;
   classifying a representative bucket size of the write-on-write distribution and the one or more utilization metrics with a machine learning model to predict a replication period for the data entity, the representative bucket size being a bucket size within a predetermined distance from a mean bucket size of the write-on-write distribution; and
   configuring the storage system to replicate the data entity in accordance with the replication period,
   wherein the data entity includes a data volume or a storage group and the replication period of the data entity specifies a duration between consecutive replications of the data entity.

10. The system of claim 9, wherein generating the write-on-write distribution includes:
   identifying a different respective set of use metrics for each of the plurality of data units; and
   classifying the respective set of use metrics for each of the plurality of data units with another machine learning model,
   wherein the other machine learning model is configured to yield, at least in part, an indication of a predicted write-on-write time.

11. The system of claim 10, wherein the respective set of use metrics for any given one of the plurality of data units includes a plurality of time values, each time value identifying a duration between a different pair of successive writes to the given data unit.

12. The system of claim 9, wherein the representative bucket size includes a mean bucket size of the write-on-write distribution.

13. The system of claim 9, wherein the one or more utilization metrics of the storage system include one or more of CPU utilization, storage device utilization, network bandwidth utilization, cache write pressure, and memory bandwidth utilization.

14. The system of claim 9, wherein the one or more utilization metrics include an amount of bandwidth that is used by the storage system for replicating the data entity.

15. The system of claim 9, wherein each of the plurality of subsets of the plurality of data units is a proper subset of the plurality of data units.

16. The system of claim 9, wherein each of the plurality of data units includes a different respective track of the data entity.

17. A non-transitory computer-readable medium storing one or more processor-executable instructions, which, when executed by at least one processor, cause the at least one processor to perform the operations of:

generating a write-on-write distribution for a plurality of data units in a data entity, the write-on-write distribution including a plurality of buckets, each bucket corresponding to a different write-on-write time range, each bucket having a respective bucket size that is based on a count of ones of the plurality of data units whose respective predicted write-on-write times fall within the bucket's write-on-write time range;

identifying one or more utilization metrics of a storage system where the data entity is hosted;

classifying a representative bucket size of the write-on-write distribution and the one or more utilization metrics with a machine learning model to predict a replication period for the data entity, the representative bucket size being a bucket size within a predetermined distance from a mean bucket size of the write-on-write distribution; and configuring the storage system to replicate the data entity in accordance with the replication period, wherein the data entity includes a data volume or a storage group and the replication period of the data entity specifies a duration between consecutive replications of the data entity.

18. The non-transitory computer-readable medium of claim 17, wherein generating the write-on-write distribution includes:

identifying a different respective set of use metrics for each of the plurality of data units; and classifying the respective set of use metrics for each of the plurality of data units with another machine learning model, wherein the other machine learning model is configured to yield, at least in part, an indication of a predicted write-on-write time.

19. The non-transitory computer-readable medium of claim 18, wherein the respective set of use metrics for any given one of the plurality of data units includes a plurality of time values, each time value identifying a duration between a different pair of successive writes to the given data unit.

20. The non-transitory computer-readable medium of claim 17, wherein the representative bucket size includes a mean bucket size of the write-on-write distribution.

\* \* \* \* \*